United States Patent Office 3,269,057
Patented August 30, 1966

3,269,057
METHOD OF TREATING WILD RICE
Richard Walter Heineman, 502 2nd Ave. S.,
Glasgow, Mont.
No Drawing. Filed Oct. 9, 1964, Ser. No. 402,940
4 Claims. (Cl. 47—58)

The present invention relates generally to a method for treating wild rice, and more specifically to a method for treating wild rice immediately prior to its ripening, and shortly before harvest time.

Wild rice is a tall annual grass which grows in shallow lakes and on marshy lands bordering tidal waters above brackish water, particularly where the streams are sluggish. An ordinary stalk of wild rice has between 15 and 150 kernels, and in a reasonably successful crop year, the figure will approach the upper limit. Normally, the rice ripens over a period of about 18 days, and hence while some kernels are ready for harvest, others still require additional time for ripening. Because of the long period of time over which the grain ripens, it is sometimes necessary to make several harvesting runs in a given area in order to obtain the ripened product. Unfortunately, the grain is extremely loosely held on the stalk, and this bond is even more fragile when the grain has completely ripened. The fully matured seeds are easily dislodged from the stalk by the slightest blow, or even by exposure to moderate weather conditions. Wild rice is normally harvested by a person moving among the plants in a canoe or small flat boat, the stalks of the plants being bent over the boat and struck with light blows from sticks, whereby the ripened grain falls into the boat. Since the fully matured seeds fall at the slightest touch, many are lost by dropping into the water instead of into the canoe or boat. Machinery has been considered for use in harvesting the crop which may be desirable from the standpoint of saving time and labor, but as of the present time there is not available any mechanical device which can be handled skillfully enough to gather the seed with less loss than is suffered by hand operations. One mechanical harvesting technique which is practiced in some areas utilizes a barge having a reel similar to that of a grain binder or combine which knocks the grain from the stalk. This technique has not proven to be valuable. Even under ideal conditions with any harvesting technique, it is extremely difficult to gather as much as 50 percent of the seed produced. One of the primary reasons for difficulty in developing successful machinery is due to the extended period of time over which the wild rice ripen. If machinery were available to harvest only the ripe grain, several passes would have to be made through the rice bed in order to obtain all of the crop. Unfortunately, any activity or motion in the bed during the time that the rice is ripe and ripening will cause a substantial loss of product due to dropping of rice kernels from the stalk. In other words, only about $1/18$ of the product matures on a given day during the ripening season, and this ripe product is extremely easily and simply dislodged from the stalk.

In accordance with the technique of the present invention, a wild rice plant may be treated in order that substantially all of the kernels may be harvested after ripening and with a single harvesting operation, each of the kernels on the stalk having been permitted to reach a dead ripe condition. The present invention enhances the strength of the bond between the stalk and the kernel and permits the ripe kernels to remain on the stalk until the remaining kernels have reached a ripe state for harvesting. The bond is not sufficiently strong to interfere with the subsequent harvesting operation. In this regard, the area of the stalk where the kernel is attached to the stalk, is coated with a thin layer of an adherent material which, when dried or cured, is capable of moderately strengthening the bond between the kernel and the stalk. The spraying is conducted at a time just prior to ripening, when the majority of the rice is in the milk stage. The binder material used is preferably sprayed onto the rice as a liquid when mixed with a suitable solvent such as water, and is preferably non-toxic in nature. Latex-base adhesives have been found to be most satisfactory for use.

Therefore, it is an object of the present invention to provide an improved method or technique for enhancing the bond between a wild rice kernel and a wild rice stalk prior to harvesting.

It is yet a further object of the present invention to provide an improved liquid spray which may be utilized to enhance the bond existing between a wild rice kernel and the wild rice stalk, the material being applied prior to harvesting of the stalk.

It is yet a further object of the present invention to provide an improved technique for treating wild rice prior to harvesting in order to strengthen the bond existing between the kernel and the stalk.

It is yet a further object of the present invention to provide an improved technique for strengthening the bond between a wild rice kernel and the stalk thereof, the bonding material being sprayed over the grain prior to complete ripening thereof, the spray material being preferably water soluble and transparent to ultraviolet radiation.

Other and further objects of the present invention will become apparent to those skilled in the art upon a study of the following specification and appended claims.

In accordance with the preferred modification of the present invention, a wild rice stand is treated with an adhesive material which adheres to the stalk in order to enhance adhesion between the kernels and the stalk at a time when the grain is approaching the ripe stage. Preferably, the adhesive is applied while the grain is in the milk stage, this condition occurring about two weeks prior to full ripening. The material is sprayed on the rice in the bed by means of a conventional technique, the quantity being applied being sufficient to form a "bead" or droplet in the stalk area between the kernel and the stalk per se. This is the weakest portion of the bond and is the area where the ripe grain will frequently drop from the stalk and be lost prior to its being collected for harvest. The bond is preferably, but not necessarily, somewhat flexible in order to provide greater resistance to shattering in case of a turbulent wind or the like striking the field subsequent to spraying and prior to harvesting but sufficiently frangible to permit its removal with conventional harvesting equipment. The bonding material preferably permits ultraviolet radiation to pass through a film thereof, and thus its presence will not interfere with the ripening process. A latex base adhesive is also suitable in this regard.

Depending upon the location, and nature of the rice bed, the equipment is normally loaded on a barge or other suitable craft, but may alternatively be positioned on shore if the rice bed is arranged such that the spray could reach each of the individual stalks in the bed. The spray operation is initiated, and continued until a bead of material is available between the stalk and the kernel. Normally, about 1 gallon, weight per gallon approximately 8 pounds, of a dilute spray of a water soluble adhesive solution having 5 percent solids are needed to cover 430 square feet of an ordinary stand of rice. It will be appreciated, of course, that a thin stand of rice will require proportionately less spray solution and a heavy stand will require a proportionately greater amount.

As indicated previously, the treating technique is carried out when the rice is in the milk stage prior to ripening. While in this stage, the rice is not adversely affected by disturbances caused from watercraft moving about in the rice field. The stalk still retains sufficient resiliency at this time to tolerate mechanical motion since the bond between the kernels and the stalk is still relatively sound while the kernels are drawing sustenance from the stalk and the bond has not as yet become brittle.

*Example I*

A typical spray comprises a latex base material such as latex base used in making water base paints, produced by Frost Paint and Oil Corporation of Minneapolis, Minnesota, which is a water soluble. The concentrated solution may be mixed similar to regular latex paint, which has a solid content of approximately 14%, and this can be thinned by a ratio of 1 gallon concentrate to 2½ gallons of water so as to become thin enough for spraying. This quantity is adequate to treat 13,150 square feet of a normal stand of rice.

This range of adhesive material is not sufficient to prevent normal harvesting techniques from removing the kernels of wild rice from the stalk. It will be appreciated that other suitable adhesives such as polyester, natural tree resins, or sprayable glue may be substituted for the latex base adhesive herein described. Another main consideration is that the adhesive be non-toxic to both the rice plant and to the rice kernels, and also that the adhesive be non-toxic to humans.

It will, of course, be understood that various changes may be made in the form, details, arrangements and proportions of the parts without departing from the scope of the invention as set forth in the appended claims.

What is claimed:

1. A method of treating wild rice prior to harvesting which comprises applying an adherent film of an air hardenable adhesive to the area of the joint between the stalk and the kernel at a time when the rice is in the milk stage.

2. The method of treating wild rice as set forth in claim 1 being particularly characterized in that said adherent film is a thin durable film of an adhesive transparent to ultraviolet radiation.

3. The method of treating wild rice prior to harvesting which comprises applying an adherent thin film of a water soluble air hardenable latex base adhesive to the area between the stalk and the kernels at a time when the rice is in the milk stage.

4. The method of treating wild rice as set forth in claim 1 being particularly characterized in that said adhesive cures to a resilient adherent film.

No references cited.

ABRAHAM G. STONE, *Primary Examiner.*

R. E. BAGWILL, *Assistant Examiner.*